United States Patent

Mabuchi et al.

[11] Patent Number: 5,843,264
[45] Date of Patent: Dec. 1, 1998

[54] VIBRATION INSULATING ASSEMBLY AND METHOD FOR MAKING THE SAME

[75] Inventors: Akira Mabuchi, Nagoya; Kanae Matsumura, Owariasahi; Takayoshi Iwata, Aichi-ken; Kazutoshi Miyake, Ichinomiya; Kyouichi Fujinami, Inazawa; Masato Ueno, Konan; Satomi Watanabe, Minokamo; Kazuya Ito, Yokkaichi; Hideyuki Imai, Kani; Hiroshi Yokoi, Nagoya, all of Japan

[73] Assignee: Toyoda Gosei Co., Ltd., Aich-ken, Japan

[21] Appl. No.: 966,962

[22] Filed: Nov. 10, 1997

Related U.S. Application Data

[63] Continuation of Ser. No. 426,904, Apr. 21, 1995, abandoned.

[30] Foreign Application Priority Data

Apr. 21, 1994 [JP] Japan .................................. 6-107499
Apr. 21, 1994 [JP] Japan .................................. 6-107500

[51] Int. Cl.⁶ ...................................................... F16F 15/00
[52] U.S. Cl. ..................... 156/245; 156/219; 156/252; 156/313; 29/892.1; 474/178; 474/94; 474/902; 248/638; 74/574; 267/141.2
[58] Field of Search .............................. 156/94, 252, 313, 156/209, 219, 245; 29/892, 892.1; 474/178, 902, 94, 273; 248/638; 74/574; 267/141.2

[56] References Cited

U.S. PATENT DOCUMENTS

| | | |
|---|---|---|
| 4,132,825 | 1/1979 | Hahn . |
| 4,468,210 | 8/1984 | McCutchan, Jr. .................. 474/178 X |
| 4,659,788 | 4/1987 | Ohta et al. . |
| 4,703,533 | 11/1987 | Barma . |
| 5,213,879 | 5/1993 | Niwa et al. . |
| 5,279,900 | 1/1994 | Takeuchi et al. . |
| 5,465,485 | 11/1995 | Miyake et al. . |
| 5,478,654 | 12/1995 | Hargis et al. . |

FOREIGN PATENT DOCUMENTS 56-135052 10/1981 Japan .

Primary Examiner—Michael W. Ball
Assistant Examiner—Sam Chuan Yao
Attorney, Agent, or Firm—Cushman Darby & Cushman IP Group of Pillsbury Madison & Sutro, LLP

[57] ABSTRACT

The present invention is directed to a vibration insulating assembly including a rubber vibration insulator and metallic members bonded thereto. In particular, the present invention relates to a method for manufacturing the same, by which the quality of the resulting assembly is improved by providing a high bonding strength between the vibration insulator and metallic members. Retainers are provided about the peripheries of the bonding surfaces of the rubber vibration insulator in order to restrict displacement and deformation of the rubber vibration insulator across the bonding surfaces or at the bonding interface with the metallic members and to facilitate its positioning. The presence of the retainers allows for the application of a predetermined pressure on the bonding surfaces to enhance the bonding strength while preventing an undesirable strain from forming in the bonding surface of the rubber vibration insulator. At least one and preferably a plurality of grains or recessed portions are preferably formed in the bonding surfaces of the rubber vibration insulator to be bonded to the metallic members. An adhesive, which is preferably solvent-free, is applied to these bonding surfaces to effect bonding.

11 Claims, 5 Drawing Sheets

VIBRATION INSULATING ASSEMBLY AND METHOD FOR MAKING THE SAME

This is a continuation of application Ser. No. 08/426,904, filed on Apr. 21, 1995, which was abandoned upon the filing hereof.

BACKGROUND OF THE INVENTION

1. Field of the Invention

The present invention pertains to vibration insulating assemblies, which are frequently used, for example, as damper pulleys, engine mounts of vehicles, or the like. Specifically, the present invention is directed to a method for bonding a rubber vibration insulator to metal, and a vibration insulating assembly which is manufactured thereby.

2. Description of the Related Art

A vibration insulating assembly generally includes a substantially cylindrical rubber member having metal plates bonded to both the end surfaces thereof. The rubber member is typically formed of a material having an excellent vibration insulating property. Generally, a solvent-type adhesive is usually employed for bonding the above-described vibration insulating rubber member to the metallic plates. Sovlent-type adhesives are preferably liquid solutions obtained by mixing a solvent, such as toluene and xylene, with water.

However, when the solvent-type adhesive is used to form a vibration insulating assembly, the metal plates must be subjected to several pretreatment steps, including surface treatment, application of an undercoat adhesive, drying, application of a finish adhesive, and further drying. Thus, numerous process steps may be required. Furthermore, where vulcanized rubber member is press-fitted onto metal members and bonded thereto to form the vibration insulating assembly, such as a damper pulley, a lubricant must be applied for press-fitting the rubber member, thereby complicating the procedures and requiring the expenditure of additional labor and time for manufacturing such an assembly. Further, many of the solvents which volatilize in the adhesive application and drying processes are harmful and can consequently impart serious health risks within the working environment.

On the other hand, solvent-free adhesives have been known. However, when a solvent-free adhesive is substituted in place of the conventional sovlent-type adhesive in order to prevent volatilization of the solvent, several alternative problems tend to arise.

For example, because solvent-free adhesives are typically in the form of gel, the rubber vibration insulator and metal plates must be fixed by jigs or the like until the adhesive cures. Moreover, the rubber vibration insulator is susceptible to deformation. As a result, proper positioning of the vibration insulator is difficult to achieve, and the bonding surfaces may be altered from their original positions, thereby distorting the shapes of the bonding surfaces. Furthermore, if pressure is exerted on the bonding surfaces of the rubber vibration insulator to promote the bonding between the ruber vibration insulator and metal plates, the bonding surfaces are expanded (i.e., distorted) and bonded in an expanded-state. After the adhesive has cured and the pressure is removed from the bonding surfaces, the resilient force of the rubber vibration insulator attempting to return to its original state generates a strain in the rubber vibration insulator. This strain increases the likelihood of deterioration occurring in the bonding strength, which can result in the separation of the vibration insulator from the metal plates or similar problems.

It is therefore an object of the present invention to provide a vibration insulating assembly having a high bonding strength by preventing distortion and deterioration of the bonding surfaces caused by deformation of a rubber material and by preventing strain in the rubber vibration insulator.

It is another object of the present invention to provide a method for producing the above-described vibration insulating assembly.

It is still another object of the present invention to reduce the manufacturing costs of producing a vibration insulator assembly by bonding a rubber vibration insulator to metal members while eliminating the above-mentioned pretreatment steps.

It is a further object of the present invention to provide a process for producing a vibration insulator assembly which obviates the harmful effects of a sovlent-type of adhesive and avoids imparting any harmful effects to the working environment.

These and other objects, features, and advantages of the present invention will become apparent from the following detailed description when taken in conjunction with the accompanying drawings which illustrate, by way of example, the principles of the present invention.

SUMMARY OF THE INVENTION

In order to overcome the above-described problems of conventional processes and to achieve the above-described objectives, the present invention provides a solvent-free adhesive for bonding a ruber vibration insulator to metal members, wherein a retainer member is also provided for retaining the vibration insulator in a predetermined position with respect to the metal members. The retaining member is preferably provided around the bonding surfaces of the vibration insulator so that bonding is effected while restricting displacement and deformation of the rubber vibration insulator. Because the vibration insulator does not undergo distortion, a predetermined pressure may be exerted on the bonding surfaces without causing distortion of the rubber vibration insulator.

According to the present invention, a vibration insulating assembly to be manufactured by the above-described method includes a rubber vibration insulator and metal members bonded thereto. The metal members may also include retaining portions for positioning and retaining the peripheries of the respective bonding surfaces of the vibration insulator. Displacement and deformation of the vibration insulator can thereby be restricted. Therefore, positioning accuracy is enhanced to prevent undesirable strains in and deformation of the insulator, thus improving the quality of the product.

Further, because pressure can be exerted on the bonding surfaces without producing deformation of the vibration insulator, the rubber vibration insulator and the metal members are closely fitted to each other, thereby improving the bonding strength. In this case, although the pressure exerted on the bonding surfaces imparts a force which would otherwise expand them outwardly, the actual deformation which the bonding surfaces undergo is restricted by the retainer member. Consequently, when the external forces are removed and the rubber vibration insulator is released from the retainer member after bonding, no strain remains in the vibration insulator, thus improving durability. The same effects can be produced from the metal members including integral retaining portions instead of the foregoing retainer member.

Moreover, in order to overcome the above-described problems associated with solvent-type adhesives, according to the present invention, a solvent-free adhesive is used for bonding a rubber vibration insulator to metal members. Grains or recessed portions are formed in the bonding surfaces of the rubber vibration insulator to be bonded to the metal members, and bonding is effected while the solvent-free adhesive is held in the grains or recessed portions. Furthermore, the solvent-free adhesive is applied to the bonding interface between the bonding surface of the vibration insulator and the bonding surface of the metal members. Preferably, the solvent-free adhesive is applied to the bonding surfaces of the rubber vibration insulator.

The solvent-free adhesive is usually in the form of gel. When it is applied to the bonding surfaces of the rubber vibration insulator, the adhesive not only covers the bonding surfaces, but also is received in the grains or recessed portions. The metal members are thereafter placed on these bonding surfaces and maintained in their predetermined positions for a sufficient period of time so as to be bonded to the bonding surfaces (i.e., to allow the adhesive to cure). Therefore, the drying process is not required, and the application of an undercoat adhesive can be omitted. When this method is applied to a damper pulley or the like, the applied adhesive also serves as a lubricant for press-fitting so that no additional lubricant is necessary, thus largely reducing the number of process steps. Finally, when opposing forces are exerted on the bonding surfaces so as to improve the bonding strength, the adhesive is held in the grains or recessed portions; consequently, the adhesive is not pressed out, thereby increasing the bonding strength.

BRIEF DESCRIPTION OF THE DRAWINGS

The accompanying drawings illustrate preferred embodiments of the present invention. In such drawings.

DETAILED DESCRIPTION OF THE PREFERRED EMBODIMENTS

Figure 1:
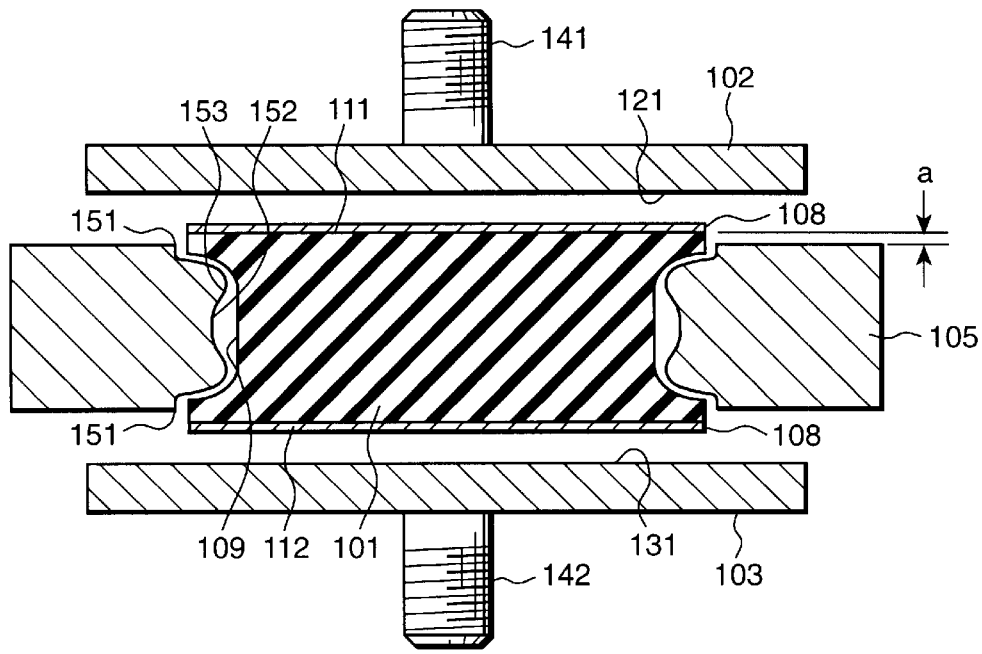
FIG. 1 is a cross-sectional view of an engine mount to which a bonding method according to a first embodiment of the present invention is applied.

A first embodiment of the present invention will be hereinafter described. FIG. 1 shows an example in which a method according to the present invention is applied to an engine mount. In this drawing, reference numeral 101 denotes a vibration insulator of a substantially cylindrical shape which is preferably made of natural rubber or the like (i.e., a material possessing a similar resiliency). Support plates 102 and 103, preferably made of steel or aluminum alloy, are respectively bonded to the upper and lower end surfaces of the rubber vibration insulator 101. Attachment bolts 141 and 142 protrude from the centers of the surfaces of the support plates 102 and 103, respectively, and can be connected to an engine or a vehicle body (not shown).

A solvent-free adhesive, such as shown at 108, is used for bonding the rubber vibration insulator 101 and the support plates 102 and 103. More specially, a two-part adhesive which mainly includes an adhesive component of epoxy, urethane, acrylic resin is particularly suitable. For example, an epoxy-type adhesive consisting of Glycidyl ether of bisphenol A and polyamine (hardenner) is very popular. Such an adhesive is applied to bonding surfaces 121 and 131 of the support plates 102 and 103, respectively, with the rubber vibration insulator 101 being interposed therebetween. Usually, the support plates 102 and 103 are fixed by jigs (not shown) so that a predetermined pressure is exerted on the upper and lower bonding surfaces 121 and 131, the pressure being asserted along a direction substantially transverse to the surfaces 121 and 131. An annular retainer 105 surrounds the periphery of the rubber vibration insulator 101.

As shown in FIG. 1, an annular inner-peripheral wall 153 of the retainer 105 is shaped to substantially conform to an outer-peripheral wall 109 of the vibration insulator 101. The retainer 105 has stepped portions 151 which are formed on upper and lower ends of the inner-peripheral wall 153 thereof to receive protrusions projecting from the edges of the outer-peripheral wall 109 of the vibration insulator 101. The stepped portions 151 will also contact and retain the peripheries of bonding surfaces 111 and 112 of the rubber vibration insulator 101, thereby preventing these bonding surfaces 111 and 112 from expanding radially upon being subjected to pressure. A gap "a" is defined between the retainer 105 and each of the bonding surfaces 111 and 112 so that the annular retainer 105 allows for at least partial compression of the rubber vibration insulator 101 upon applying pressure thereto. A recessed portion 152 is formed in a middle portion of the inner-peripheral wall 153 of the retainer 105. Because the bonding surfaces 111 and 112 are retained by the retainer 105, when the rubber vibration insulator 101 is vertically compressed under pressure, the forces resulting from such pressure are transferred to the middle portion of the vibration insulator 101, which is allowed to expand outwardly. The recessed portion 152 serves not to hinder the expansion of the middle portion.

Next, the solvent-free adhesive 108 is heated to its heat curing temperature and maintained for a sufficient period of time for effecting bonding. The curing temperature varies in accordance with particular type of adhesive selected. For example, the curing temperature of a urethane-type adhesive is about 120° C., and when it is maintained for about 60 minutes, a favorable bonding strength can be obtained. With a solvent-free adhesive having a relatively low curing temperature, as described above, heating does not cause re-vulcanization or the like, even if vulcanized rubber is used. Accordingly, deterioration of the rubber is prevented.

Since the positioning of the rubber vibration insulator 101 can be maintained by the retainer 105 in the above-described manner, deviation of the positioning of the bonding surface 111 and 112 does not occur so that such surfaces will not produce stresses against plates 102 and 103, respectively. Also, by applying the predetermined pressure to the bonding surfaces along a direction substantially transverse to the surfaces 111 and 112, the bonding strength between the vibration insulator 101 and the support plates 102 and 103 can be enhanced. In addition, because the bonding surfaces do not expand, stress in the compression direction does not remain in the rubber vibration insulator 101, thus further improving the bonding strength. It is of particular note that when sufficient pressure is exerted on the bonding surfaces, the adhesive 108 on the bonding surfaces may be pressed out radially and contact the retainer 105. To facilitate the removal of the retainer 105 in such a situation, the upper and lower end surfaces of the retainer 105 may be applied with a mold-releasing agent or coated with silicone resin or the like so that the retainer 105 can be readily removed.

In the foregoing embodiment, the inner-peripheral wall 153 of the retainer 105 substantially conforms to (with the exception of recessed portion 152) and retains the entire outer-peripheral wall 109 of the rubber vibration insulator 101. However, the design of the retainer 105 is not so limited. The retainer 105 may be designed differently so long as it retains at least the peripheries of the bonding surfaces 111 and 112 of the rubber vibration insulator 101.

Preferably, in this embodiment, the film thickness of the adhesive 108 after curing is about 20 $\mu$m to about 40 $\mu$m.

Figure 2:
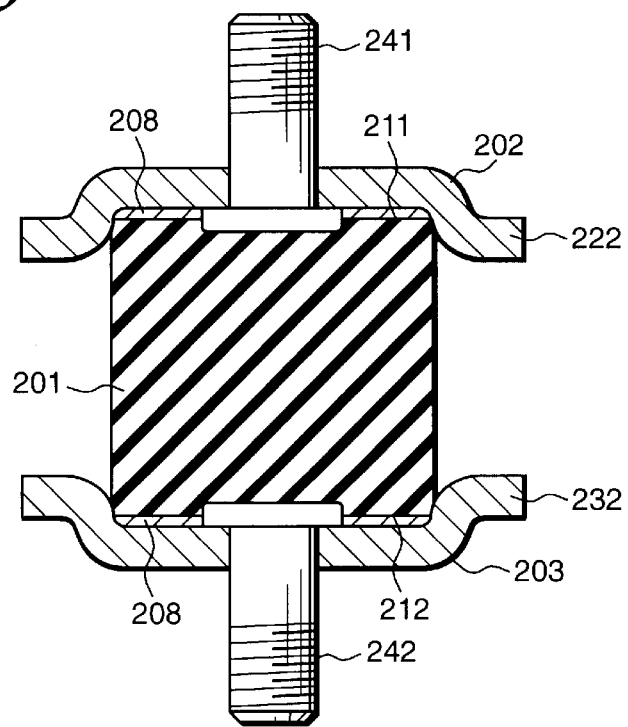
FIG. 2 is a cross-sectional view of an engine mount according to a second embodiment of the present invention.

FIG. 2 shows a second embodiment of the present invention in which support members 202 and 203, which are preferably formed from metallic material, also serve as retaining members. As shown in this drawing, the support member 202 to be bonded to the upper surface of a rubber vibration insulator 201 has a substantially disk-like shape, with its peripheral edge extending in a downward direction along the outer and upper periphery of the vibration insulator 201, then bending again and extending in an outward direction to form a retaining portion 222 which is substantially parallel to the central disk-shaped portion of support member 202. The support member 203 also includes a retaining portion 232 similarly formed.

When these support members 202 and 203 are bonded to the rubber vibration insulator 201 in the above-described manner, the retaining portions 222 and 232 retain the peripheries of bonding surfaces 211 and 212, respectively, of the vibration insulator 201. As a result, the vibration insulator 201 is maintained in a predetermined position and the bonding surfaces 211 and 212 are prevented from expanding. In addition, when pressure is exerted on the bonding surfaces, the adhesive is sealed by the rubber vibration insulator 201 and the retaining portions 222 and 223 of respective support members 202 and 203, thereby preventing the adhesive from being pressed out of the bonding surfaces 211 and 212.

An adhesive 208 used in the second embodiment can be the same as in the first embodiment. Preferably, the film thickness of the adhesive 208 after curing is about 20 $\mu$m to about 200 $\mu$m.

Figure 3A:
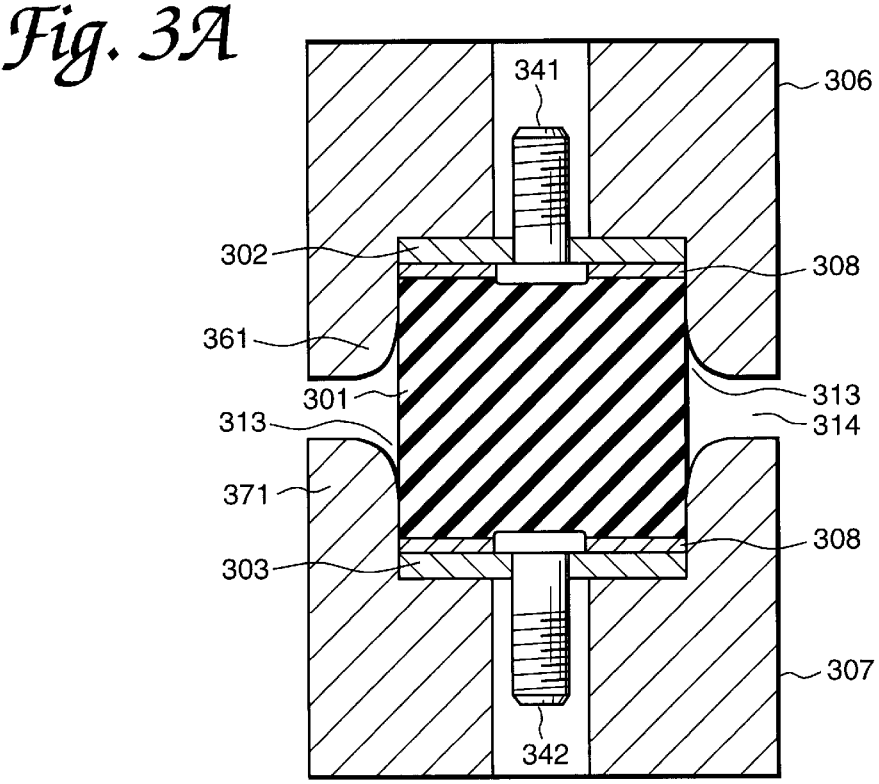
FIG. 3A is a cross-sectional view of an engine mount fixed by jigs which also serve as retaining members in accordance with a third embodiment of the present invention.
Figure 3B:
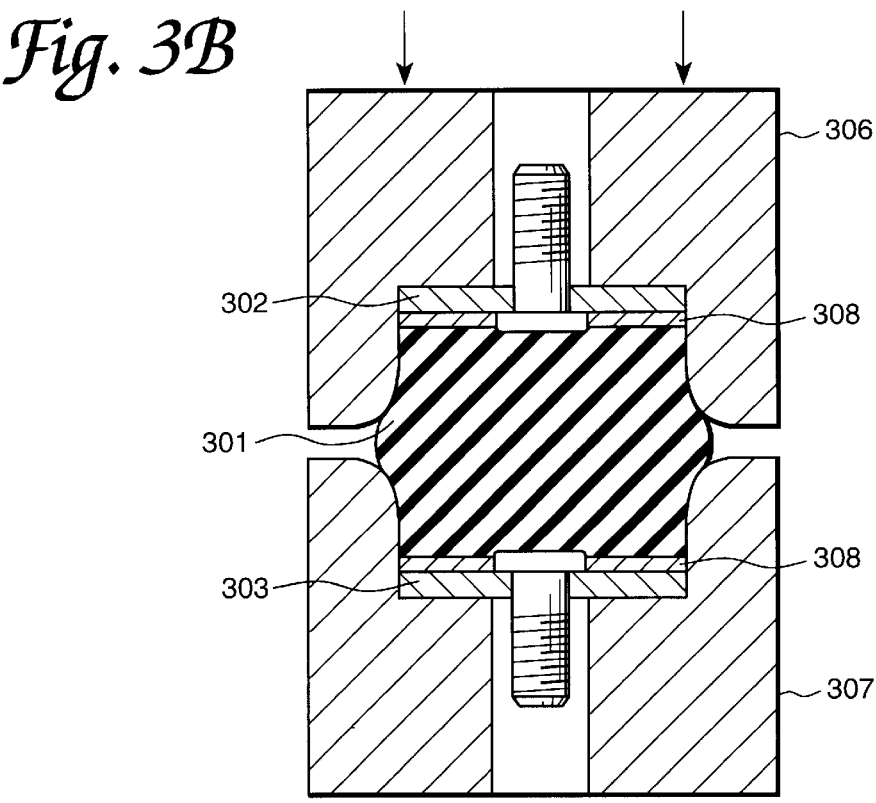
FIG. 3B is a cross-sectional view of the engine mount shown in FIG. 3A when a predetermined pressure is exerted on the engine mount.

FIGS. 3A and 3B show a third embodiment of the present invention. In this embodiment, upper and lower jigs 306 and 307 for fixing metallic support members 302 and 303 serve as retaining members. As shown in FIG. 3A, the upper jig 306 has a centrally-located recess for receiving bolt 341. The jig 306 has an interior portion which is shaped to receive the support member 302. The outer-peripheral end of the upper jig 306 extends downwardly part way along the side walls of support wall 302 and vibration insulator 301 to define an integral retaining portion 361 which retains the upper and outer periphery of an end surface of rubber vibration insulator 301. The lower jig 307, which is similarly positioned with respect to the lower support wall 303 and bolt 342, also includes an integral retaining portion 371 similarly formed.

The outer peripheral edges of the retaining portions 361 and 371 have smoothly curved surfaces which taper outwardly and away from the rubber vibration insulator 301 so as to define a space 313 between the vibration insulator 301 and the tapering portions of each of the retaining portions 361 and 371. In addition, retaining portion 361 is spaced from retaining portion 371 so as to define an annular space 314 surrounding the outer periphery of the vibration insulator 301 at about the center along the longitudinal length thereof.

As shown in FIG. 3B, when pressure is applied to the upper and lower jigs 306 and 307, the support members 302 and 303 are moved towards one another, thereby compressing the vibration insulator 301. Because the end portions of the vibration insulator 301 adjacent members 302 and 303 and the bonding surfaces at each end of the rubber insulator 301 are retained (i.e., not allowed to expand radially) by the retaining portions 361 and 371, only the central portion of the vibration insulator 301 will expand radially, as shown, into the above-described spaces 313 and 314. As a result, deviation or deformation of the bonding surfaces is prevented. Moreover, the retaining portions 361 and 371 prevent the adhesive 308 from being pressed out of the bonding surfaces.

The upper and lower jigs 306 and 307 are preferably formed of a non-adhesive material such as a silicone resin wholly or at least at the inner-peripheral surfaces of the retaining portions 361 and 371. Also, the through holes bored in the central portions of both the jigs 306 and 307 facilitate the introduction of a pin for extracting a product.

The adhesive 308 used in this embodiment is the same as in the second embodiment. Preferably, the film thickness of the adhesive 308 after curing is about 20 $\mu$m to about 200 $\mu$m.

Figure 4A:
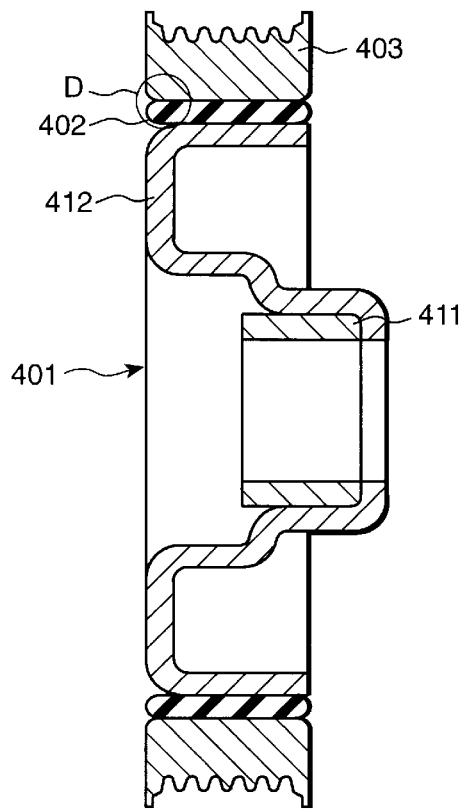
FIG. 4A is a cross-sectional view of a damper pulley to which a bonding method according to a fourth embodiment of the present invention is applied.
Figure 4B:
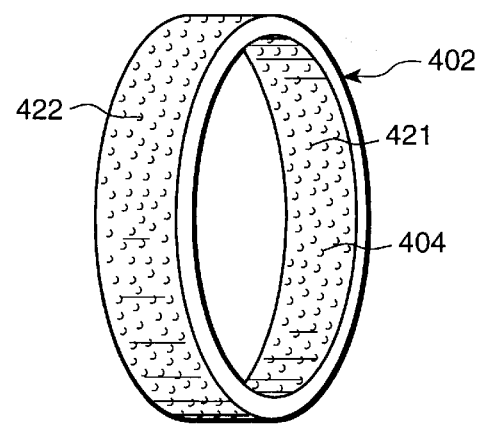
FIG. 4B is a perspective view of a rubber vibration insulator to which a bonding method according to a fourth embodiment of the present invention is applied.
Figure 4C:
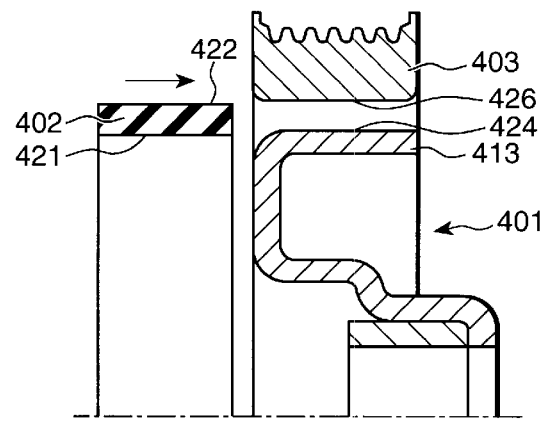
FIG. 4C is a cross-sectional view for explaining the bonding method of the rubber vibration insulator and metal members according to a fourth embodiment of the present invention.

A fourth embodiment of the present invention is shown in FIGS. 4A to 4C, where the method of the present invention is applied to a damper pulley. In FIG. 4A, reference numeral 401 generally denotes a pulley body formed of a metal plate. The pulley body includes a central cylindrical boss portion 411, a body portion 412 extending outwardly from the outer wall of the boss portion 411 across the width of the pulley body 401, and a flange 413 forming the outer periphery of the body portion 412 and extending back across the width of the pulley body 401 substantially parallel to boss portion 411. An annular mass 403, preferably formed of metal, is provided outside of flange 413, and an annular rubber vibration insulator 402 is interposed between the annular mass 403 and the flange 413. A rotary shaft (not shown) is fitted in the boss portion 411. The mass 403 and the rubber vibration insulator 402 constitute a dynamic damper.

The rubber vibration insulator 402 is formed of vulcanized rubber (e.g., natural rubber material a material having similar properties). As shown in FIG. 4B, the inner and outer peripheral surfaces 421 and 422, respectively, of the rubber vibration insulator 402 serve as bonding surfaces for connection to the outer surface 424 of flange 413 and the interior 426 of mass 403, respectively. Grains or recesses 404 are formed in the entire bonding surfaces 421 and 422. These grains 404 are formed, for example, by providing projections on the surfaces of dies (not shown) which are used to mold the vibration insulator 402. Preferably, the grains 404 formed in the peripheral surfaces 421 and 422 of the rubber vibration insulator 402 do not provide mere pits and projections but are shaped and oriented to hold an adhesive applied in the bonding process. In other words, such shapes are desired that while convex portions of the bonding surfaces with the grains 404 are press-fitted to the metallic surfaces, spaces are individually defined between concave portions of the grains 404 and the metallic surfaces.

A solvent-free adhesive is used for bonding the rubber vibration insulator 402 and the metallic members. More specially, a two-part adhesive which mainly includes an adhesive component of epoxy, urethane, acrylic resin is particularly suitable. For example, an epoxy-type adhesive consisting of Glycidyl ether of bisphenol A and polyamine (hardenner) is very popular.

Such a solvent-free adhesive is applied to the peripheral surfaces 421 and 422 of the rubber vibration insulator 402. A sufficient amount of the adhesive should be held on the surfaces of the rubber vibration insulator 402, especially in the grains 404. Subsequently, the rubber vibration insulator 402 is inserted between the mass 403 and the flange 413 (FIG. 4C), and the flange 413 is deformed to enlarge its diameter so as to firmly press against the inner peripheral surface of the vibration insulator 402. The diametrical deformation of the flange 413 causes the rubber vibration insulator 402 to be expanded. The expansion of the rubber vibration insulator 402 causes the vibration insulator 402, the mass 403, and the flange 413 to be closely fitted with each other, thereby improving the bonding strength. However, the adhesive, which is accommodated within the grains 404, is not thereby pressed out from the interface of the bonding surfaces.

Next, the adhesive is heated to its curing temperature and maintained for a sufficient period of time until the adhesive cures. The curing temperature varies in accordance with the type of adhesive selected. For example, the curing temperature of a urethane-type adhesive is about 120° C., and when it is maintained for about 60 minutes, an adequate bonding strength can be obtained. By contrast, a conventional solvent-type adhesive must be heated close to the vulcanization temperature of rubber (about 160° C.) before it cures. Therefore, potential problems can arise insofar as the re-vulcanization of the rubber material becomes possible. However, according to the present invention a solvent-free adhesive, which has a relatively low curing temperature, is used, so that re-vulcanization does not occur, and the integrity of the rubber material is not jeopardized.

Figure 4D:
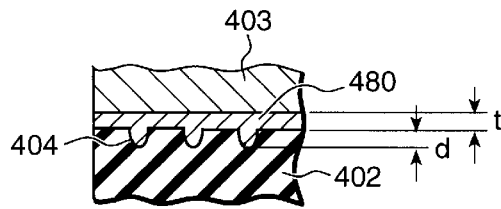
FIG. 4D is an enlarged cross-sectional view of the portion D of FIG. 4A, before the rubber vibration insulator is pressed.

FIG. 4D is an enlarged view showing the portion "D" of FIG. 4A of the fourth embodiment. The film thickness "t" of the adhesive 480 on the general surface between the annular mass 403 and the rubber vibration insulator 402 (excluding the depth "d" of the grains 404) is about 10 $\mu$m to about 20 $\mu$m and not less than about 10 mm after curing, and an appropriate depth "d" of the grains 404 is about 40 $\mu$m to about 200 $\mu$m. As shown in a further enlarged view of FIG. 4E, as the rubber undergoes further expansion, the thickness "t" on the general surface is suitably about 1 $\mu$m at the minimum and smaller than the maximum film thickness of an adhesive layer without grains 404. However, a sufficient bonding strength can be obtained as a result of the adhesive being accommodated in the grains 404.

The solvent-free adhesive used in the present invention is known to have a favorable adhesive property with metal, and normally, the metal need not be subjected to surface treatment. By contrast, in a conventional set-up, a "finish adhesive" is subsequently applied to the surface after the "undercoat adhesive" has cured. In the present invention, however, the adhesive may be applied in a single process step, and a drying process and a press-fitting lubricant application process are not required. Accordingly, the number of process steps is reduced.

Furthermore, unlike the conventional solvent-type adhesive, the solvent-free adhesive used in accordance with the present invention does not exhibit the tendency to crack when press-fitted. More specifically, because application of a conventional adhesive to the rubber material can cause the adhesive to crack when the rubber material is press-fitted, the conventional solvent-type adhesive is usually applied to the metal surface. In the present invention, however, the solvent-free adhesive in the form of gel is employed, and because the grains 404 are formed on the rubber vibration insulator 402, a sufficient amount of the adhesive can be applied directly to and held on the surface of the insulator 402 without resulting in any cracking.

In the fourth embodiment, the grains 404 are formed in the bonding surfaces. However, the present invention is not limited to this embodiment. That is, so long as the adhesive can be held on the bonding surfaces, various modifications of the shape and configuration of the bonding surfaces and grains can be made in accordance with the particular type of apparatus to which the present invention is applied.

Figure 5A:
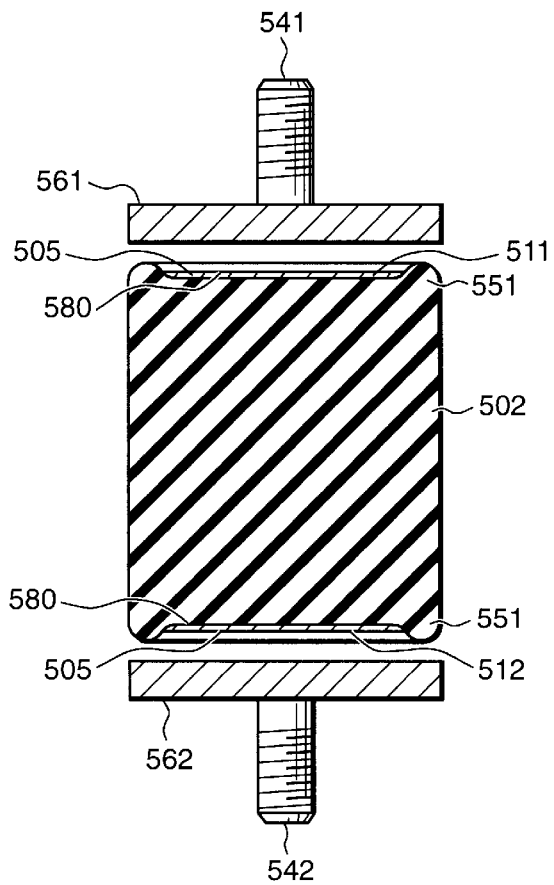
FIG. 5A is a cross-sectional view of an engine mount to which a method according to a fifth embodiment of the present invention is applied.

FIG. 5A shows a fifth embodiment in which the method of the present invention is applied to an engine mount. In this drawing, reference numeral 502 denotes a rubber vibration insulator of a substantially cylindrical shape which has support members 561 and 562, preferably made from a metallic material, respectively bonded to the upper and lower end surfaces thereof. Attachment bolts 541 and 542 protrude from the respective centers of the surfaces of the support members 561 and 562, respectively, and can be connected to an engine or a vehicle body (not shown).

The upper and lower end surfaces 511 and 512, respectively, of the rubber vibration insulator 502, which are the bonding surfaces, contain outer-peripheral edges 551, which surround and define concentrically-located recessed portions 505 at each end. When the above-mentioned solvent-free adhesive is applied to these upper and lower end surfaces 511 and 512, the adhesive 580 is held in the recessed portions 505. The rubber vibration insulator 502 is interposed between the support members 561 and 562 and maintained at a predetermined temperature for a sufficient period of time for effecting bonding (i.e., curing). In order to improve the bonding strength, a predetermined pressure is preferably exerted on the bonding surfaces. Since the outer-peripheral edges of the recessed portions 505 serve as sealing portions 551, the adhesive 580 can be prevented from being pressed out and escaping from the bonding surfaces. Thus, similarly to the foregoing embodiments, a favorable bonding strength can be obtained. The recessed portions 505 may be divided into a plurality of sections and separated by partitions. For example, a honeycomb structure as shown in FIG. 5B can further improve the fluid tightness, thereby enhancing the adhesive holding capacity.

Figure 5B:
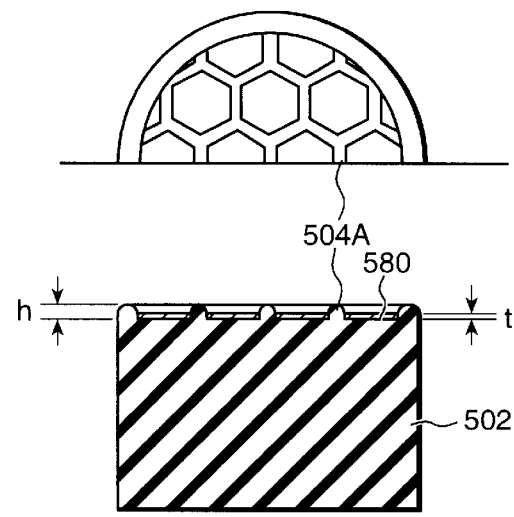
FIG. 5B is an enlarged partial view showing a modified embodiment of the engine mount of FIG. 5A.
Figure 5C:
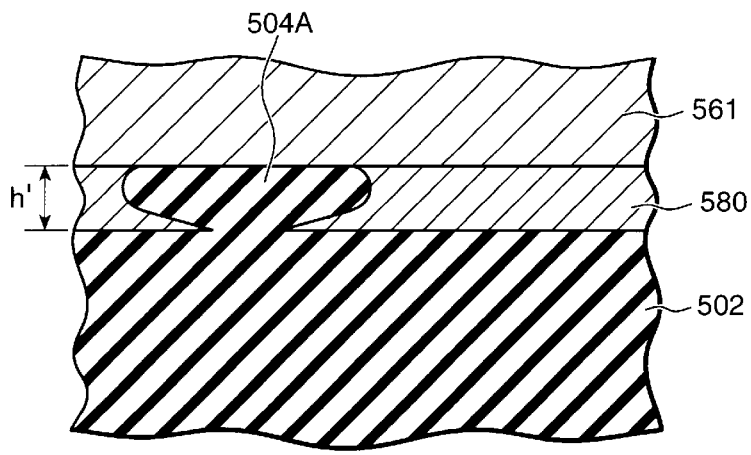
FIG. 5C is an enlarged partial view showing a modified embodiment of the engine mount of FIG. 5A.

When the adhesive is applied to the honeycomb structure, as shown in FIG. 5B, the height "h" of the partitions 504A is preferably about 0.5 mm, and the width is preferably about 0.5 mm. Because of problems associated with machining, the width is preferably not less than 0.5 mm at the minimum. In the bonding process, as shown in FIG. 5C, the height of the partitions 504A which have collapsed to a height "h'" is about 150 μm, which is the same as the height of the adhesive layer.

Even if the distance between the partitions 504 and the metallic support member 561 becomes zero, a sufficient bonding strength can be maintained by the adhesive held in concave sections of the honeycomb structure.

The depth of such concave sections is desirably not more than about 1 mm, because a greater depth will increase the likelihood that the partitions 504 will collapse. This depth should be made larger than the thickness "t" of the adhesive layer indicated in FIG. 5B.

Figure 6:
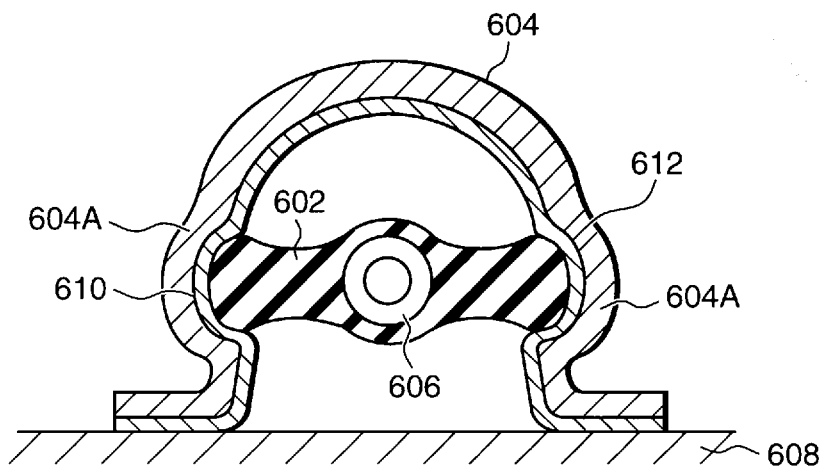
FIG. 6 is a cross-sectional view of an engine mount, produced according to a sixth embodiment of the invention.

FIG. 6 shows a sixth embodiment in which the method of the present invention is applied to an engine mount of a different configuration. In this drawing, a rubber vibration insulator 602 having a substantially propeler-shape cross-section is bonded in an outer cylinder 604 of an inverted U-shape, and an inner cylinder 606 is embedded in a central portion of the vibration insulator 602. The outer cylinder 604 has end portions which are outwardly bent and fastened, by bolts or another suitable fastening device, to a vehicle body 608. The inner cylinder 606 will be connected to an engine (not shown).

Figure 4E:
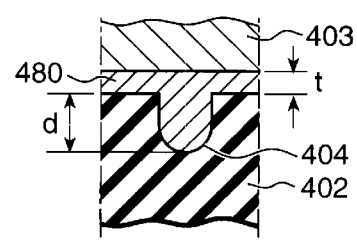
FIG. 4E is an enlarged cross-sectional view of the portion D of FIG. 4A, after the rubber vibration insulator is pressed.

Opposite end portions 610 and 612 of the rubber vibration insulator 602 serve as bonding surfaces, and grains (not shown) which are similar to the grains 404 as shown in FIGS. 4D and 4E of the fourth embodiment, are formed in the entire bonding surfaces 610 and 612. After the solvent-free adhesive is applied to both of the bonding surfaces 610 and 612, the rubber vibration insulator 602 is inserted into the outer cylinder 604 and maintained at a predetermined temperature for a sufficient period of time for effecting bonding. Even if pressure is exerted on the bonding surfaces 610 and 612, the adhesive is held in the grains on the bonding surfaces 610 and 612, thereby preventing the adhesive from escaping from the bonding surfaces 610 and 612.

In this embodiment, the outer cylinder 604 includes two semi-circular curved portions 604A formed in opposite side surfaces thereof. The curved portions 604A receive and retain opposite end portions of the rubber vibration insulator 602. In a conventional engine mount, because the rubber vibration insulator 602 is susceptible to deformation, a problem could potentially arise insofar as the bonding surfaces of the vibration insulator 102 and the metallic member may be displaced. However, in accordance with the configuration of the sixth embodiment of the present invention, the curved portions 604A restrict the movement of the rubber vibration insulator 602 and reliably retain it until the adhesive cures.

Figure 7:
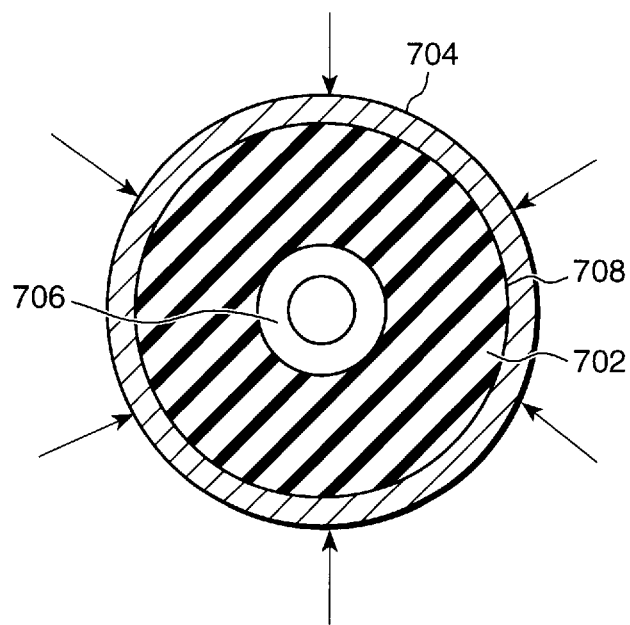
FIG. 7 is a cross-sectional view of a vibration insulating bushing, produced according to a seventh embodiment of the invention.

FIG. 7 shows an embodiment in which the method of the present invention is applied to a vibration insulating bushing. In this drawing, a rubber vibration insulator 702 having a circular cross-section is bonded in an outer cylinder 704, and an inner cylinder 706 is concentrically embedded in the vibration insulator 702.

The rubber vibration insulator 702 has the same grains as shown in FIGS. 4D and 4E of the fourth embodiment. The grains are formed over the entire outer-peripheral surface 708, which defines a bonding surface. After the solvent-free adhesive is applied to the bonding surface 708, the rubber vibration insulator 702 is inserted into the outer cylinder 704, and fixed therein by diametrically pressing the outer cylinder 704 so that it is moved relative to the vibration insulator 702. Subsequently, the adhesive is maintained at a predetermined temperature for a sufficient period of time for effecting bonding. As noted above, because the adhesive is held in the grains on the bonding surface 708, the adhesive can be prevented from escaping from the bonding surfaces.

In the present invention, not necessarily restricted to the above-described embodiments, the preferred thickness of the adhesive layer is about 10 μm to about 400 μm when grains are not formed in the bonding surface. If the thickness of the adhesive layer is not more than 10 μm, the bonding strength varies by a large degree.

Moreover, the preferred depth of the grains is about 20 μm to about 400 μm. If the depth of the grains is less than about 20 μm, the adhesive holding capacity is unsuitably decreased.

A preferred pressure of which is exerted on bonding interfaces is not less than about 10 kgf/cm$^2$. If the pressure is less than about 1 kgf/cm$^2$, the bonding strength is unsuitably poor.

More preferably, the thickness of the adhesive layer and the depth of the grains are preferably no more than about 200 μm in view of such factors as machinability, economic feasibility, and prevention of cracking in the adhesive layer (e.g., stress, change over time).

According to the present invention, solvent-free adhesive renders the drying process unnecessary. Moreover, the adhesive is applied to the bonding surfaces of the rubber vibration insulator making use of the press-fitting lubricant unnecessary. Thus, the number of processes required to produce the assembly can be significantly decreased, thereby reducing manufacturing costs. In addition, when the grains or recessed surfaces are formed in the bonding surfaces of the rubber vibration insulator, the adhesive is not pressed out, even if pressure is exerted on the bonding surfaces to improve the bonding strength. Furthermore, the positioning of the rubber vibration insulator can be easily maintained by the retaining members around the vibration insulator so as to prevent deformation of the bonding surfaces of the vibration insulator. Therefore, generation of internal strain can be prevented to improve the bonding strength by a large degree. Finally, because solvent volatilization does not occur, harmful effects to the working environment can be averted.

Although the present invention has been described in detail with reference to its presently preferred embodiments, it will be understood by those of ordinary skill in the art that various modifications and improvements to the present invention are believed to be apparent to one skilled in the art. Accordingly, no limitation upon the invention is intended, except as set forth in the appended claims.

What is claimed is:

1. A method for bonding opposite ends of a rubber vibration insulator, which is formed of vulcanized rubber, to a metallic member at each end, comprising the steps of:

forming individually defined isolated recesses having a depth d for holding adhesive in at least one of first and second bonding surfaces defined on said opposite ends of the rubber vibration insulator such that said at least one of the first and second bonding surfaces does not define (a) pits and projections;

applying a solvent-free adhesive in the form of a gel to first and second bonding interfaces defined between the opposite ends of the rubber vibration insulator, respectively, and a bonding surface of each of first and second metallic members, said adhesive accommodated in said grains;

forming the first and second bonding interfaces by compressing the opposite ends against the first and second metallic members, respectively, wherein said adhesive accommodated in said recesses provides a sufficient bonding strength to hold said rubber vibration insulator to said metallic members; and curing the adhesive while restricting displacement of the rubber vibration insulator relative to the metallic members.

2. The method of claim 1, wherein the film thickness, excluding the depth d, is not less than about 10 μm after curing.

3. The method of claim 1, wherein said recesses have a depth of not less than about 20 μm.

4. The method of claim 1, wherein each of the recesses is defined individually so as to hold the adhesive in the individual recesses, thereby providing sufficient bonding strength to hold said rubber vibration insulator to said metallic members.

5. The method of claim 1, wherein said recesses are shaped and oriented during die molding of said rubber insulator.

6. The method of claim 1, wherein said gel also operates as a lubricant.

7. The method of claim 1, wherein the recesses are shaped and oriented to hold the adhesive therein.

8. The method of claim 1, wherein said displacement is restricted by the recesses in one or more of said bonding surfaces of the rubber vibration insulator.

9. The method of claim 1, wherein said depth d is about 20 μm to about 400 μm.

10. The method of claim 1, wherein additional bonding strength is obtained by adhesive in a space between said rubber vibration insulator and said metallic members.

11. The method of claim 1, wherein said adhesive in said recesses at said depth d is not pressed out of said recesses during said compressing.

* * * * *